(12) United States Patent
Kitahara

(10) Patent No.: US 12,111,194 B2
(45) Date of Patent: Oct. 8, 2024

(54) FLOW RATE DETECTION DEVICE AND METHOD FOR MANUFACTURING THE FLOW RATE DETECTION DEVICE

(71) Applicant: DENSO CORPORATION, Kariya (JP)

(72) Inventor: Noboru Kitahara, Kariya (JP)

(73) Assignee: DENSO CORPORATION, Kariya (JP)

( * ) Notice: Subject to any disclaimer, the term of this patent is extended or adjusted under 35 U.S.C. 154(b) by 317 days.

(21) Appl. No.: 17/672,987

(22) Filed: Feb. 16, 2022

(65) Prior Publication Data

US 2022/0170772 A1   Jun. 2, 2022

Related U.S. Application Data

(63) Continuation of application No. PCT/JP2020/033098, filed on Sep. 1, 2020.

(30) Foreign Application Priority Data

Sep. 23, 2019 (JP) ................................. 2019-172383

(51) Int. Cl.
*G01F 1/684* (2006.01)
*G01K 1/08* (2021.01)
*G01K 13/02* (2021.01)

(52) U.S. Cl.
CPC ............... *G01F 1/684* (2013.01); *G01K 1/08* (2013.01); *G01K 13/02* (2013.01)

(58) Field of Classification Search
CPC ........ G01F 1/684; G01F 1/6842; G01F 1/696; G01F 5/00; G01K 1/08; G01K 13/02; G01L 15/00; G01L 19/0092
USPC ........... 73/204.11–204.27; 29/593, 594, 595, 29/825, 854, 876, 877, 881; 156/60, 182
See application file for complete search history.

(56) References Cited

U.S. PATENT DOCUMENTS

2006/0079029 A1   4/2006   Nakamura

FOREIGN PATENT DOCUMENTS

JP   2018-096728   6/2018
JP   2021-050943   4/2021

*Primary Examiner* — Robert R Raevis
(74) *Attorney, Agent, or Firm* — Nixon & Vanderhye, PC

(57) ABSTRACT

A physical quantity sensor detects a physical quantity of a fluid and a sealing resin. The physical quantity sensor is mounted on a circuit board and includes an electrode part electrically connected to the circuit board. The sealing resin is provided on a physical quantity sensor mounting surface, which is formed on the circuit board and equipped with the physical quantity sensor, and covers the electrode part. The physical quantity sensor mounting surface includes a mounting region surface including a place where the physical quantity sensor is provided and a place where the sealing resin is provided and a peripheral region surface extending around the mounting region surface. A wettability of the mounting region surface for the sealing resin in a liquid form is higher than a wettability of the peripheral region surface for the sealing resin in the liquid form.

14 Claims, 8 Drawing Sheets

FLOW RATE DETECTION DEVICE AND METHOD FOR MANUFACTURING THE FLOW RATE DETECTION DEVICE

CROSS REFERENCE TO RELATED APPLICATION

The present application is a continuation application of International Patent Application No. PCT/JP2020/033098 filed on Sep. 1, 2020, which designated the U.S. and claims the benefit of priority from Japanese Patent Application No. 2019-172383 filed on Sep. 23, 2019. The entire disclosures of all of the above applications are incorporated herein by reference.

TECHNICAL FIELD

The present disclosure relates to a flow rate detection device that detects a flow rate of a fluid and a method for manufacturing the flow rate detection device.

BACKGROUND

Conventionally, a flow rate detection device including a sensor device is known.

SUMMARY

According to an aspect of the present disclosure, a flow rate detection device comprises a housing that includes a sub-passage configured to partly pass a fluid, which flows through a main passage and is to be measured. The flow rate detection device further comprises a circuit board that is partly fixed to the housing and equipped with a flow rate sensor, which is provided in the sub-passage and configured to detect a flow rate of the fluid to be measured, and an electronic component, which constitutes a control circuit.

DETAILED DESCRIPTION

Figure 1:
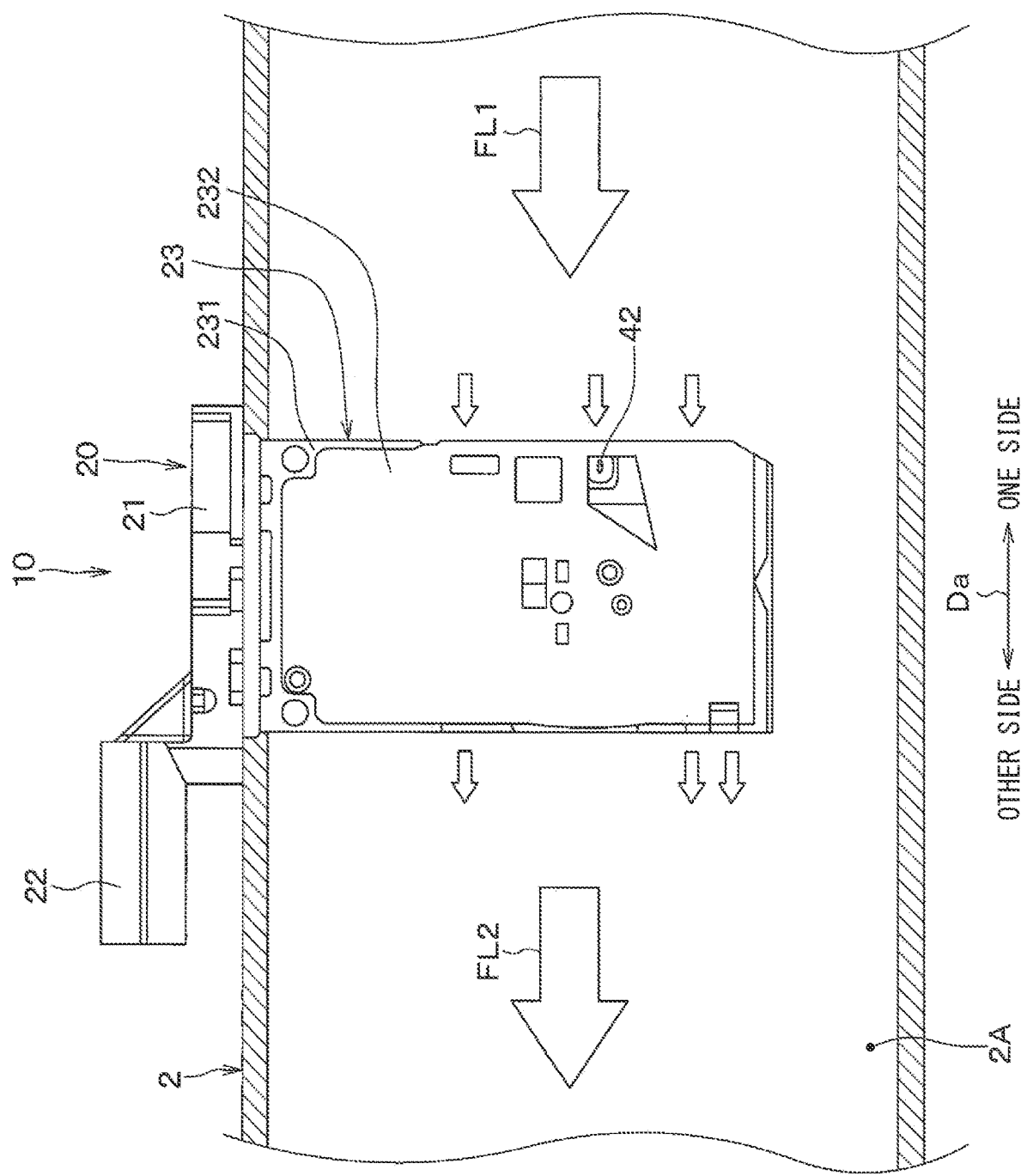
FIG. 1 is a front view illustrating a flow rate detection device as viewed in a direction from one side to the other side in a board thickness direction in a first embodiment together with a section of an intake pipe to which the flow rate detection device is attached.

According to an example of the present disclosure, a flow rate detection device includes a sensor device. The sensor device includes a circuit board. The circuit board is equipped with not only a flow rate sensor that detects a flow rate of a fluid to be measured, but also a physical quantity sensor that detects a physical quantity other than the flow rate of the fluid to be measured.

To protect an electrode part of the physical quantity sensor electrically connected to the circuit board in the flow rate detection device, the inventors have considered applying a sealing resin in a liquid form around the electrode part of the physical quantity sensor and curing the sealing resin while the electrode part is covered with the sealing resin.

However, when the sealing resin in a liquid form is applied onto the circuit board, it is assumed that the sealing resin wet-spreads before being cured, thereby increasing a variation in an application range of the sealing resin. When the variation in the application range of the wet spread of the sealing resin increases as described above, the amount of application of the sealing resin is unstable due to the increase in the variation, and thus it becomes difficult to reliably cover the electrode part of the physical quantity sensor, for example. This matter causes deterioration in quality of the flow rate detection device. As a result of detailed studies performed by the inventors, the above has been found.

According to an example of the present disclosure, a flow rate detection device comprises a housing that includes a sub-passage configured to partly pass a fluid, which flows through a main passage and is to be measured. The flow rate detection device further comprises a circuit board that is partly fixed to the housing and equipped with a flow rate sensor, which is provided in the sub-passage and configured to detect a flow rate of the fluid to be measured, and an electronic component, which constitutes a control circuit. The flow rate detection device further comprises a physical quantity sensor that is mounted on the circuit board as a sensor different from the flow rate sensor. The physical quantity sensor includes an electrode part, which is electrically connected to the circuit board, and is configured to detect a physical quantity of the fluid to be measured. The flow rate detection device further comprises a sealing resin that is provided on a physical quantity sensor mounting surface, which is formed on the circuit board and equipped with the physical quantity sensor, and covers the electrode part. The physical quantity sensor mounting surface includes a mounting region surface that includes a place where the physical quantity sensor is provided and a place where the sealing resin is provided, and a peripheral region surface that extends around the mounting region surface. A wettability of the mounting region surface for the sealing resin in a liquid form is higher than a wettability of the peripheral region surface for the sealing resin in the liquid form.

When the sealing resin in a liquid form is applied covering the electrode part of the physical quantity sensor, the above way limits wet spread of the sealing resin in the liquid form from a mounting region surface due to wettability in the peripheral region surface. Thus, as compared with when there is no difference in wettability between the mounting region surface and the peripheral region surface described above, variation in the sealing resin can be reduced, and thus deterioration in quality of the flow rate detection device due to the variation in the sealing resin can be avoided.

Here, the wet spread of the sealing resin means that a wetted perimeter of the sealing resin in a liquid form spreads on a physical quantity sensor mounting surface. The wetted perimeter of the sealing resin is an outer edge of a part of the sealing resin in contact with the physical quantity sensor mounting surface.

According to an example of the present disclosure, a method is for manufacturing a flow rate detection device. The flow rate detection device includes a housing that includes a sub-passage configured to partly pass a fluid, which flows through a main passage and is to be measured, and a circuit board that is partly fixed to the housing. The circuit board is equipped with a flow rate sensor, which is provided in the sub-passage and configured to detect a flow rate of the fluid to be measured, and an electronic component, which constitutes a control circuit. The method comprises preparing the circuit board equipped with a physical quantity sensor, which is different from the flow rate sensor and configured to detect a physical quantity of the fluid to be measured, the physical quantity sensor including an electrode part electrically connected to the circuit board, and a sealing resin in a liquid form. The method further comprises applying the sealing resin in the liquid form to a physical quantity sensor mounting surface, which is formed on the circuit board and equipped with the physical quantity sensor, to cover the electrode part. The method further comprises curing the sealing resin after the sealing resin is applied. The physical quantity sensor mounting surface includes a mounting region surface including a place where the physical quantity sensor is located and a peripheral region surface extending around the mounting region surface. A wettability of the mounting region surface for the sealing resin in the liquid form is higher than a wettability of the peripheral region surface for the sealing resin in the liquid form. The sealing resin in the liquid form is applied to the mounting region surface of the physical quantity sensor mounting surface in the applying the sealing resin.

Even this case enables obtaining an operational effect as in the flow rate detection device according to the above one viewpoint. That is, as compared with when there is no difference in wettability between the mounting region surface and the peripheral region surface described above, variation in the sealing resin can be reduced, and thus deterioration in quality of the flow rate detection device due to the variation in the sealing resin can be avoided.

Hereinafter, embodiments will be described with reference to the drawings. In the following embodiments including other embodiments to be described later, the same or equivalent parts are denoted by the same reference numerals in the drawings.

First Embodiment

In the present embodiment, an example in which a flow rate detection device 10 of the present disclosure is applied to an internal combustion engine control system that controls an internal combustion engine will be described. The flow rate detection device 10 of the present embodiment uses intake air sucked into the internal combustion engine as a fluid to be measured, and measures various kinds of physical quantity of the fluid to be measured, such as a flow rate. The internal combustion engine control system controls a degree of opening of a throttle valve (not illustrated), a flow rate of a fluid to be measured supplied to the internal combustion engine, the amount of fuel, ignition timing, and the like by adjusting a fuel injection valve and an ignition plug in accordance with a measurement result of the flow rate detection device 10.

Figure 2:
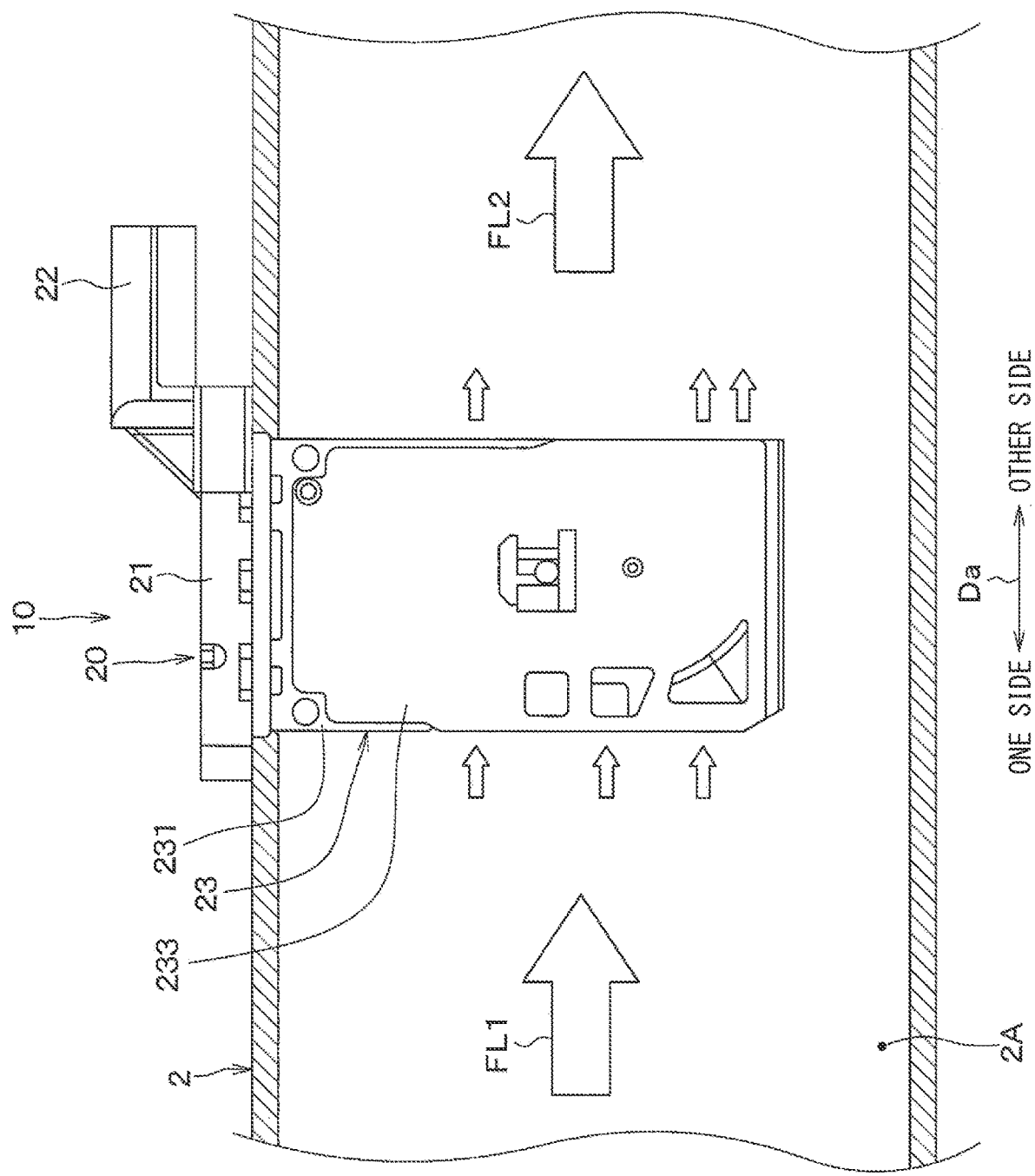
FIG. 2 is a rear view illustrating the flow rate detection device as viewed in a direction from the other side to the one side in the board thickness direction together with a section of the intake pipe in the first embodiment, or is a diagram illustrating the flow rate detection device and the section of the intake pipe as viewed in a direction opposite to FIG. 1.

As illustrated in FIGS. 1 and 2, the flow rate detection device 10 is attached to an intake pipe 2 through which the fluid to be measured flows. The intake pipe 2 is a cylindrical pipe constituting a main passage 2A through which air as a fluid to be measured flows. That is, the main passage 2A extends in a main passage extension direction Da, and the fluid to be measured in the main passage 2A flows from a one side in the main passage extension direction Da as an upstream side toward the other side in the main passage extension direction Da as a downstream side. The intake pipe 2 is not limited to a cylindrical pipe, and may be composed of, for example, a square tubular pipe.

Figure 3:
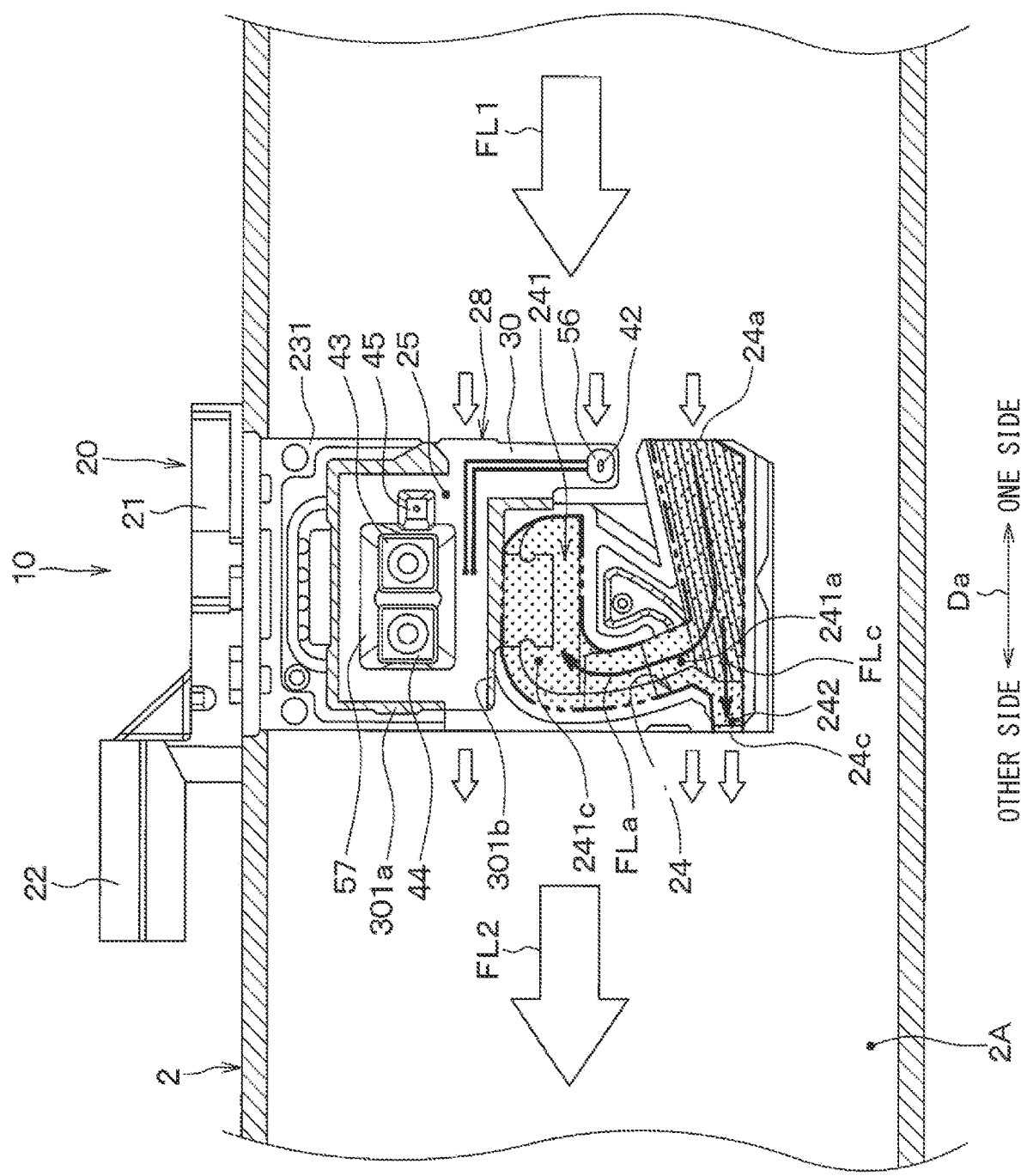
FIG. 3 is a diagram illustrating the flow rate detection device and the section of the intake pipe with a one side cover that is virtually removed in the first embodiment as viewed in the same direction as FIG. 1.
Figure 4:
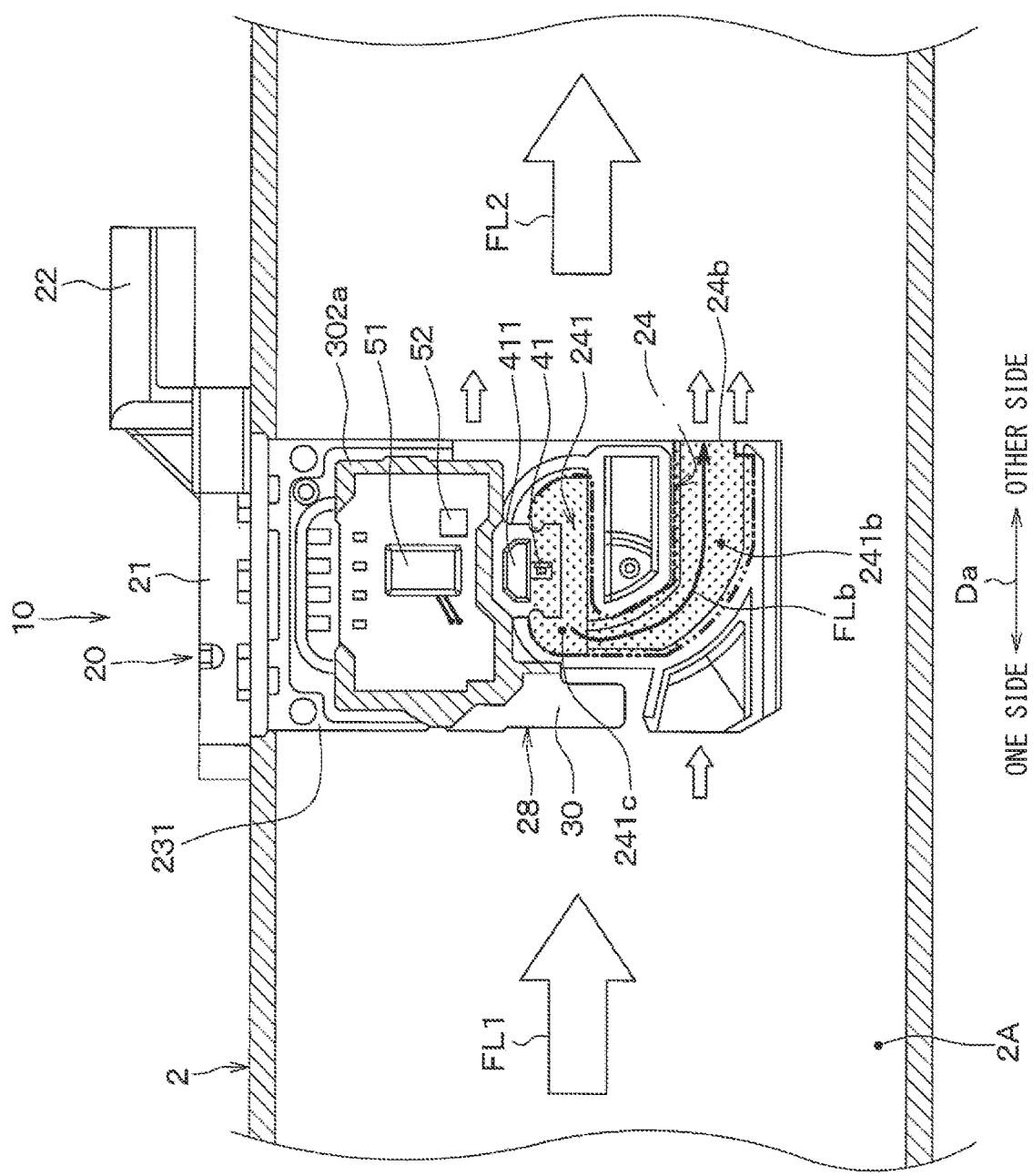
FIG. 4 is a diagram illustrating the flow rate detection device and the section of the intake pipe with a second-side cover that is virtually removed in the first embodiment as viewed in the same direction as FIG. 2.
Figure 5:
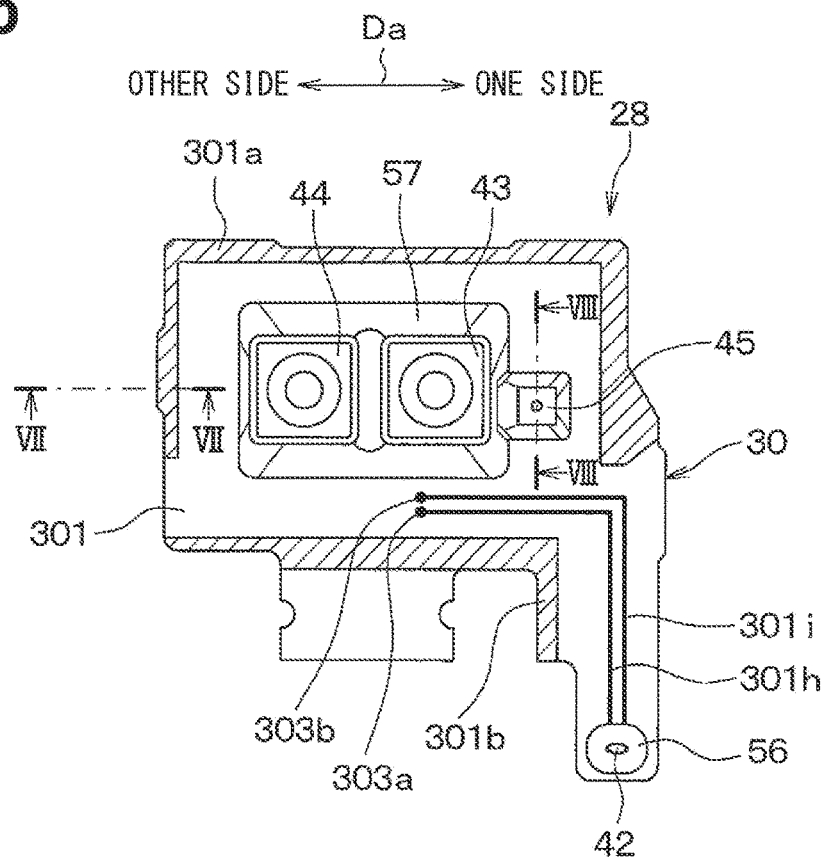
FIG. 5 is a front view illustrating a single board assembly included in the flow rate detection device in the first embodiment as viewed in the same direction as FIG. 1.
Figure 6:
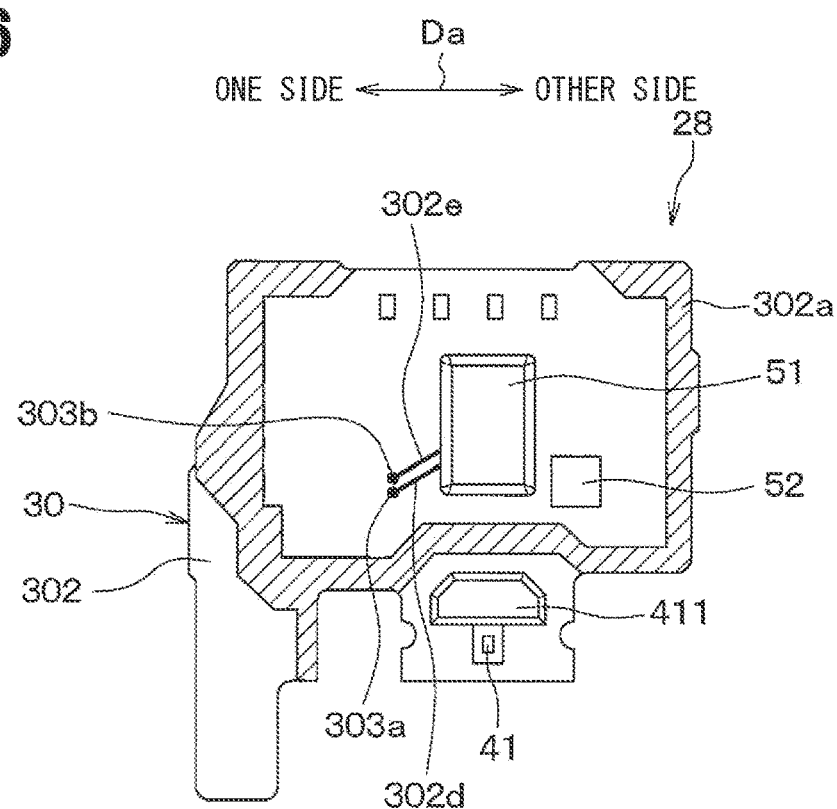
FIG. 6 is a rear view illustrating the single board assembly included in the flow rate detection device in the first embodiment as viewed in the same direction as FIG. 2.

As illustrated in FIGS. 1 to 4, the flow rate detection device 10 includes a housing 20 as a housing of the flow rate detection device 10 and a board assembly 28. The board assembly 28 includes a circuit board 30 and a plurality of mounted components mounted on the circuit board 30. Specifically, the board assembly 28 includes a circuit board 30, a flow rate sensor 41, a terminal protection part 411 of the flow rate sensor 41, a temperature sensor 42, a first pressure sensor 43, a second pressure sensor 44, a humidity sensor 45, an LSI 51, a microcomputer 52, and sealing resins 56, 57. The board assembly 28 alone is illustrated in FIGS. 5 and 6.

As illustrated in FIGS. 1 to 4, the housing 20 of the flow rate detection device 10 is at least partly provided in the main passage 2A. The housing 20 includes a flange part 21 for fixing the flow rate detection device 10 to the intake pipe 2, an external connection part 22 exposed to the outside from the flange part 21 for electrical connection with an external device, and a measurement part 23 protruding from the flange part 21 toward the center of the main passage 2A.

The flange part 21 is fitted into an attachment hole provided in the intake pipe 2, and thus being connected to the intake pipe 2.

The external connection part 22 is provided on an upper surface of the flange part 21 and protrudes from the flange part 21 toward downstream in a flow direction of the fluid to be measured. Arrows FL1, FL2 in FIGS. 1 to 4 each indicate a flow of the fluid to be measured in the main passage 2A.

The external connection part 22 electrically connects the flow rate detection device 10 to a control device of an internal combustion engine control system (not illustrated). Information indicating a measurement result is output from the flow rate detection device 10 to the outside through a connection terminal accommodated in the external connection part 22. Additionally, power for driving the flow rate detection device 10 is supplied through the connection terminal in the external connection part 22. The external connection part 22 is not limited to a protrusion protruding toward downstream in the flow direction of the fluid to be measured, and may be a protrusion protruding toward upstream or a protrusion protruding upward.

The measurement part 23 includes a connection part connected to the flange part 21 as a base end part, and extends from the flange part 21 into the main passage 2A along a radial direction of the intake pipe 2. The measurement part 23 is formed in a substantially plate shape having a certain thickness while spreading along the flow direction (i.e., the main passage extending direction Da) of the fluid to be measured in the main passage 2A. The measurement part 23 has a thickness direction that is identical to a thickness direction of the circuit board 30 included in the board assembly 28, and that is orthogonal to the main passage extending direction Da.

Figure 7:
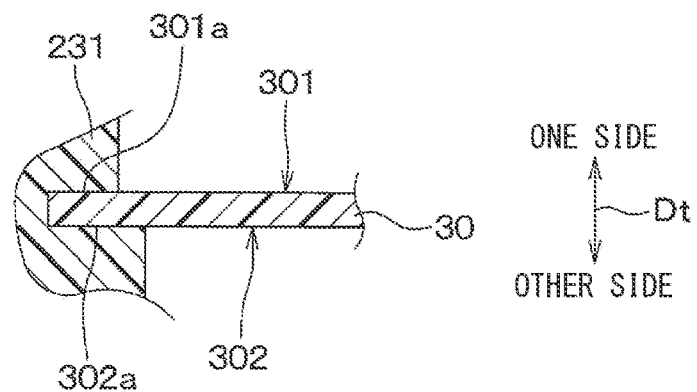
FIG. 7 is a sectional view of the flow rate detection device of the first embodiment taken along line VII-VII in FIG. 5.
Figure 8:
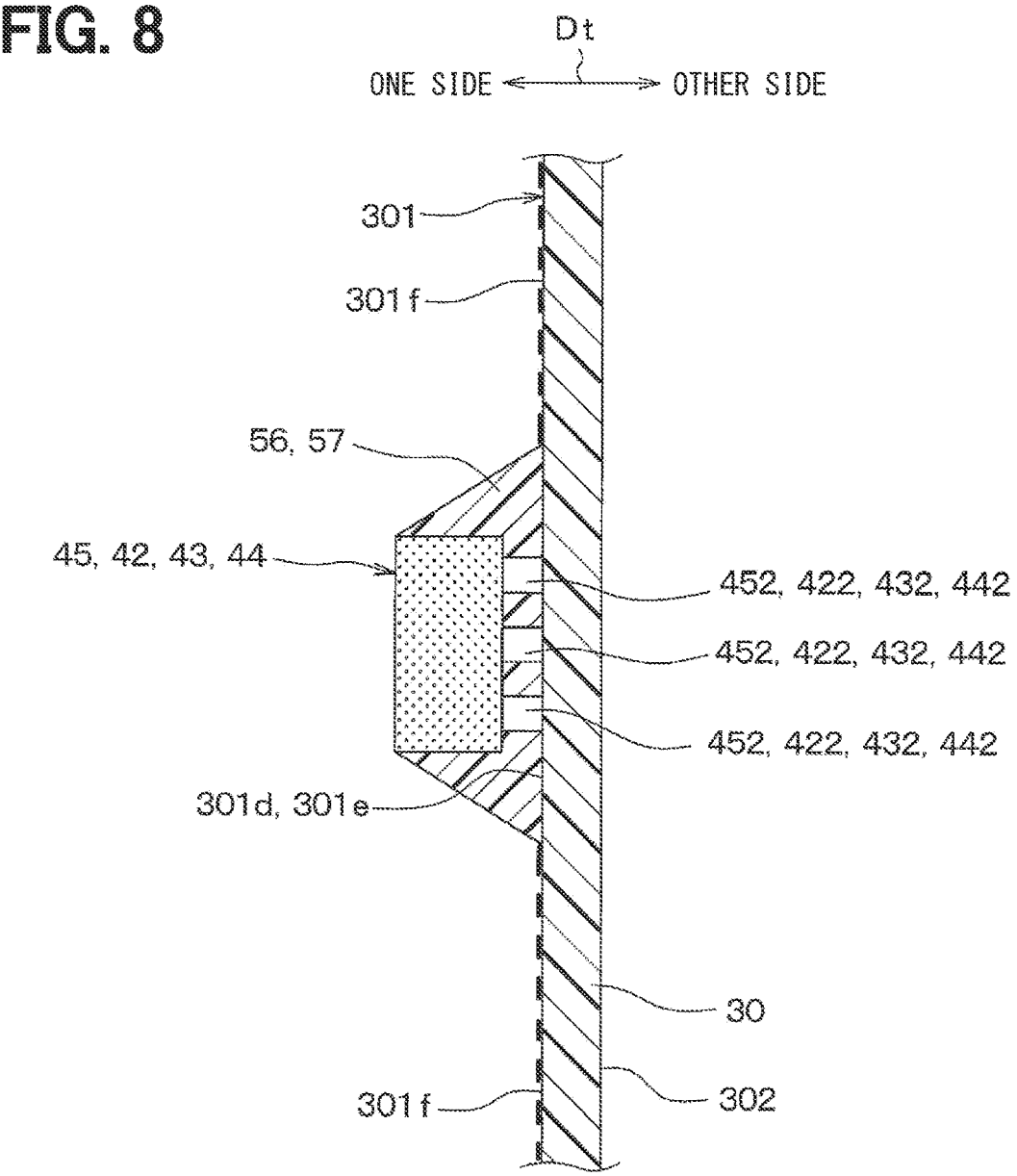
FIG. 8 is a sectional view of the single board assembly included in the flow rate detection device in the first embodiment, taken along line VIII-VIII in FIG. 5.

The present embodiment is described in which the thickness direction of the circuit board 30 is referred to as a board thickness direction Dt (see FIGS. 7 and 8). In FIGS. 1 to 4, the board thickness direction Dt is identical to a direction perpendicular to the paper surface. In FIGS. 1 and 3, a front side in the direction perpendicular to the paper surface is a one side in the board thickness direction Dt, and a back side in the direction perpendicular to the paper surface is the other side in the board thickness direction Dt.

The measurement part 23 is provided inside with a fluid passage through which the fluid to be measured flows, and is incorporated with the board assembly 28. Specifically, the measurement part 23 includes a measurement part body 231, a one-side cover 232, and a second-side cover 233. As illustrated in FIGS. 3 and 4, the measurement part body 231 is made of, for example, resin, and is formed by insert molding with the board assembly 28 as an insert.

Each of the one-side cover 232 and the second-side cover 233 is formed in a substantially plate shape having a thickness in the board thickness direction Dt. As illustrated in FIGS. 1 and 2, the one-side cover 232 is provided covering the measurement part body 231 from the one side in the board thickness direction Dt, and is joined to the measurement part body 231 by, for example, welding or the like. The second-side cover 233 is provided covering the measurement part body 231 from the other side in the board thickness direction Dt, and is joined to the measurement part body 231 by, for example, welding or the like. When each of the one-side cover 232 and the second-side cover 233 is joined to the measurement part body 231 as described above, a fluid passage through which the fluid to be measured flows is formed between the one-side cover 232 and the second-side cover 233.

More specifically, the measurement part 23 is provided, as illustrated in FIGS. 3 and 4, with a sub-passage 24 through which the fluid to be measured, flowing through the main passage 2A, passes. The sub-passage 24 corresponds to the fluid passage through which the fluid to be measured flows. The sub-passage 24 is formed by a groove, which is formed in the measurement part body 231, together with the first-side and second-side covers 232, 233 covering the groove. In FIGS. 3 and 4, the sub-passage 24 is indicated by dotted hatching.

The measurement part 23 is provided with a sub-passage inlet 24a for partly taking the fluid to be measured into the sub-passage 24, a sub-passage outlet 24b for returning the fluid to be measured from the sub-passage 24 to the main passage 2A, and a discharge part 24c. The sub-passage inlet 24a, the sub-passage outlet 24b, and the discharge part 24c are provided at respective positions close to a leading end of the measurement part 23.

The sub-passage inlet 24a is opened toward the one side (i.e., upstream in the flow direction of the fluid to be measured) in the main passage extension direction Da. Conversely, the sub-passage outlet 24b and the discharge part 24c are opened toward the other side (i.e., downstream in the flow direction of the fluid to be measured) in the main passage extension direction Da.

The sub-passage 24 includes a sub-main passage 241 through which the fluid to be measured taken in from the sub-passage inlet 24a passes, and a sub-branch passage 242 that branches from the sub-passage 241 and through which the fluid to be measured flowing through the sub-passage 241 partly passes.

The sub-main passage 241 includes an upstream passage part 241a, a downstream passage part 241b, and a communication part 241c that allows the upstream passage part 241a and the downstream passage part 241b to communicate with each other. The upstream passage part 241a is located at a position displaced toward the one side in the board thickness direction Dt of the measurement part 23, and the downstream passage part 241b is located at a position displaced toward the other side in the board thickness direction Dt of the measurement part 23.

The upstream passage part 241a extends from the sub-passage inlet 24a toward downstream in the flow direction of the fluid to be measured, and the sub-branch passage 242 branches in the middle of the upstream passage part 241a. The upstream passage part 241a extends from a part, which is branched from the sub-branch passage 242, toward downstream in the flow direction of the fluid to be measured while being curved approaching the flange part 21, and communicates with the communication part 241c downstream of the upstream passage part 241a. The fluid to be measured having flowed into the upstream passage part 241a from the sub-passage inlet 24a flows through the upstream passage part 241a toward the communication part 241c as indicated by an arrow FLa.

The communication part 241c is formed as a space passing through the measurement part body 231 in the board thickness direction Dt. The circuit board 30 includes a part provided in the communication part 241c, and the flow rate sensor 41 is mounted on the part of the circuit board 30. That is, the flow rate sensor 41 is provided in the sub-passage 24, and detects a flow rate of the fluid to be measured flowing in the sub-passage 24. Although a type of the flow rate sensor 41 is not limited, for example, the flow rate sensor 41 is configured as a thermal flow meter.

The downstream passage part 241b extends from the sub-passage outlet 24b toward upstream in the flow direction of the fluid to be measured. The downstream passage part 241b extends toward upstream while being curved approach the flange part 21, and communicates with the communication part 241c upstream of the downstream passage part 241b. The fluid to be measured having flowed into the downstream passage part 241b from the communication part 241c flows through the downstream passage part 241b toward the sub-passage outlet 24b as indicated by an arrow FLb.

In the sub-main passage 241 configured as described above, the upstream passage part 241a, the communication part 241c, and the downstream passage part 241b are provided in this order from upstream in the flow direction of the fluid to be measured. Thus, the fluid to be measured having flowed into the sub-main passage 241 from the sub-passage inlet 24a rotates approximately one round as indicated by the arrows FLa, FLb, and then is discharged from the sub-passage outlet 24b to the outside of the flow rate detection device 10.

The sub-branch passage 242 allows the part branched from the sub-main passage 241 to communicate with the discharge part 24c. The sub-branch passage 242 extends linearly along the flow direction of the fluid to be measured from the part, which is branched from the sub-main passage 241, toward the discharge part 24c, and the fluid to be measured flows in the sub-branch passage 242 toward the discharge part 24c as indicated by an arrow FLc. The sub-branch passage 242 is provided to discharge foreign matter (e.g., water, dust, oil, and the like) having a large mass, which has entered the sub-passage 24 from the sub-passage inlet 24a, from the discharge part 24c to the outside of the flow rate detection device 10.

As illustrated in FIG. 3, an open space 25 is formed in the measurement part 23. The open space 25 is opened toward the one side and the other side in the main passage extension direction Da, so that the fluid to be measured flowing through the main passage 2A also partly flows through the open space 25. The fluid to be measured also flows between the open space 25 and the main passage 2A through through-holes partly provided in the one-side cover 232 and the second-side cover 233 (see FIGS. 1 and 2). The open space 25 is separated from the sub-passage 24 by the measurement part body 231.

As illustrated in FIGS. 3 and 5, the temperature sensor 42, the first pressure sensor 43, the second pressure sensor 44, and the humidity sensor 45 mounted on the circuit board 30 are provided in the open space 25. Each of the temperature sensor 42, the first pressure sensor 43, the second pressure sensor 44, and the humidity sensor 45 corresponds to a physical quantity sensor that is mounted on the circuit board 30 as a sensor different from the flow rate sensor 41 and that detects a physical quantity of the fluid to be measured. Thus, the physical quantity sensors 42, 43, 44, 45 in the present embodiment include the temperature sensor 42 and other sensors 43, 44, 45 other than the temperature sensor 42.

The temperature sensor 42 detects a temperature of the fluid to be measured, which is one of physical quantities of the fluid to be measured, and outputs a detection signal indicating the temperature. Each of the first pressure sensor 43 and the second pressure sensor 44 detects pressure of the fluid to be measured, which is one of the physical quantities of the fluid to be measured, and outputs a detection signal indicating the pressure. The humidity sensor 45 detects relative humidity of the fluid to be measured, which is one of the physical quantities of the fluid to be measured, and outputs a detection signal indicating the relative humidity. In the description of the present embodiment, the temperature sensor 42, the first pressure sensor 43, the second pressure sensor 44, and the humidity sensor 45 may be collectively referred to as physical quantity sensors 42 to 45.

As illustrated in FIGS. 5 and 6, the circuit board 30 is formed in a flat plate shape, and is provided on the one side in the board thickness direction Dt with a first surface 301 and on the other side (i.e., the side opposite to the first surface 301) in the board thickness direction Dt with a second surface 302. That is, the circuit board 30 includes the first surface 301 and the second surface 302 that are formed as board surfaces of the circuit board 30. All of the physical quantity sensors 42 to 45 are mounted on the first surface 301 of the first surface 301 and the second surface 302 of the circuit board 30. Thus, a physical quantity sensor mounting surface 301 equipped with the physical quantity sensors 42 to 45 in the present embodiment is the first surface 301 of the circuit board 30.

The circuit board 30 is, for example, a glass epoxy board using a glass epoxy material as a base material, and a wiring pattern constituting an electric circuit is formed on each of the first surface 301 and the second surface 302.

The second surface 302 of the circuit board 30 is equipped with the LSI 51, the microcomputer 52, and the flow rate sensor 41. The LSI 51 and the microcomputer 52 are electronic components constituting a control circuit for performing, for example, signal processing related to a detection signal of each of the sensors 41 to 45.

The circuit board 30 includes a plurality of through-holes 303a, 303b. The plurality of through-holes 303a, 303b respectively allows wiring patterns 301h, 301i provided on the first surface 301 of the circuit board 30 to be connected to wiring patterns 302d, 302e provided on the second surface 302 of the circuit board 30. The through-holes 303a, 303b are each not used for soldering an electrode (i.e., a terminal) of a mounted component to a wiring pattern or a land. That is, the through-holes 303a, 303b are each a through-hole that is not soldered, and are each composed of a fine through-hole penetrating from the first surface 301 to the second surface 302, for example.

The flow rate sensor 41 is provided on the second surface 302 of the circuit board 30, and is connected to the wiring pattern of the circuit board 30 by, for example, wire bonding. The wire bonding forms a wire connection part that is covered and protected by a terminal protection part 411 made of a cured potting resin. The terminal protection part 411 is formed rising from the second surface 302 of the circuit board 30.

For example, the potting resin of the terminal protection part 411 is applied in a liquid state to the connection part between the flow rate sensor 41 and the circuit board 30, and cures after the application to cover the connection part. As a result, the connection part is protected by the terminal protection part 411. The potting resin can be handled generally in a liquid state, and has a cured state that is maintained at normal temperature. Examples of the potting resin include an epoxy resin, a silicone resin, a fluororesin, and a urethane resin.

As illustrated in FIGS. 3 to 6, the measurement part body 231 is formed by insert molding with the board assembly 28 as an insert, so that a part of the circuit board 30 is fixed to the measurement part body 231. In short, the part of the circuit board 30 is fixed to the housing 20 including the measurement part body 231. In other words, the circuit board 30 is partly fixed to the housing 20.

Thus, the circuit board 30 includes one or more fixed parts 301a, 301b fixed to the measurement part body 231 of the housing 20 as a part of the physical quantity sensor mounting surface 301 as illustrated in FIGS. 5 to 7. In the present embodiment, there are two fixed parts 301a, 301b as a part of the physical quantity sensor mounting surface 301, and a first fixed part 301a and a second fixed part 301b correspond to the fixed parts 301a, 301b. The circuit board 30 also includes a second-surface side fixed part 302a fixed to the measurement part body 231 of the housing 20, as a part of the second surface 302 of the circuit board 30.

FIGS. 5 and 6 each illustrate the first fixed part 301a, the second fixed part 301b, and the second-surface side fixed part 302a, with hatching. FIGS. 3 and 4 each purposely illustrate the first fixed part 301a, the second fixed part 301b, and the second-surface side fixed part 302a, which are even hidden behind the measurement part body 231 and cannot be actually seen, with hatching for easy understanding of placement thereof.

As illustrated in FIGS. 5 and 8, the physical quantity sensors 42 to 45 respectively includes metal electrode parts 422, 432, 442, 452 that are electrically connected to the circuit board 30. For example, the electrode parts 422, 432, 442, 452 are each connected to a wiring pattern of the circuit board 30 by soldering.

Specifically, the temperature sensor 42 includes the electrode part 422, the first pressure sensor 43 includes the electrode part 432, the second pressure sensor 44 includes the electrode part 442, and the humidity sensor 45 includes the electrode part 452. Although FIG. 8 illustrates a section taken along line VIII-VIII in FIG. 5 (i.e., a section of the humidity sensor 45), FIG. 8 also illustrates reference numerals of the sensors 42, 43, 44 other than the humidity sensor 45 and of the electrode parts 422, 432, 442 of the sensors. In the description of the present embodiment, the electrode parts 422, 432, 442, 452 may be abbreviated as the electrode parts 422 to 452.

A first sealing resin 56, which is one of the cured sealing resins 56, 57, is provided on the physical quantity sensor mounting surface 301 while covering the electrode part 422 of the temperature sensor 42. A second sealing resin 57, which is the other of the cured sealing resins 56, 57, is provided on the physical quantity sensor mounting surface 301 while covering the electrode parts 432, 442, 452 of respectively the first pressure sensor 43, the second pressure sensor 44, and the humidity sensor 45.

For example, the first sealing resin 56 is applied in a liquid state around the electrode part 422 on the physical quantity sensor mounting surface 301, and cures after the application to cover the electrode part 422. The electrode part 422 is accordingly protected by the first sealing resin 56. The same applies to the protection of the electrode parts 432, 442, 452 with the second sealing resin 57. The sealing resins 56, 57 can be handled generally in a liquid state, and each have a cured state that is maintained at normal temperature. Examples of the sealing resins include an epoxy resin, a silicone resin, a fluororesin, and a urethane resin.

Figure 9:
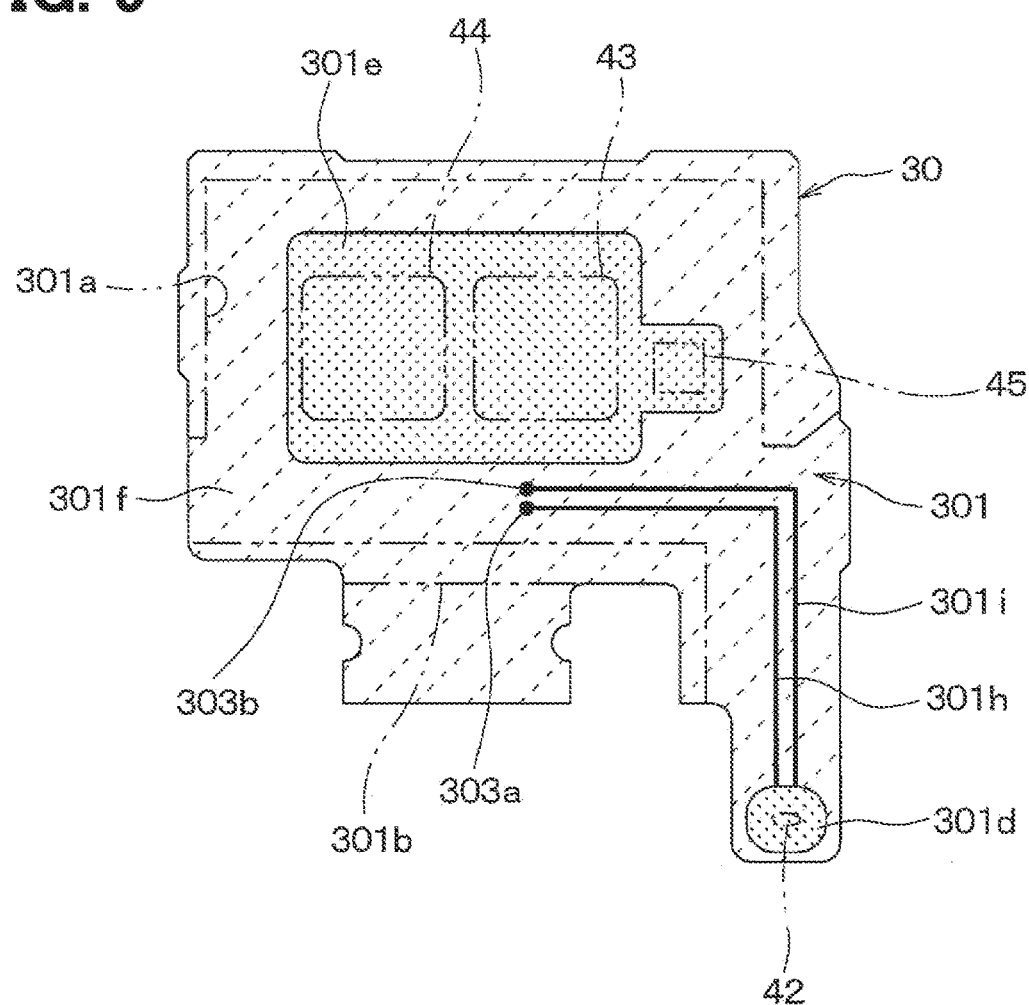
FIG. 9 is a schematic diagram illustrating a single circuit board included in the flow rate detection device of the first embodiment in the same direction as FIG. 5, and illustrating two region surfaces including a mounting region surface and a peripheral region surface of a physical quantity sensor mounting surface in a distinguished manner.

As illustrated in FIGS. 5, 8, and 9, the physical quantity sensor mounting surface 301 is here configured to restrict an unnecessary wet spread of the sealing resins 56, 57 in a liquid form. Specifically, the physical quantity sensor mounting surface 301 includes mounting region surfaces 301d, 301e, and a peripheral region surface 301f extending around the mounting region surfaces 301d, 301e. The mounting region surfaces 301d, 301e constitute a region including a place where the physical quantity sensors 42 to 45 are provided and a place where the sealing resins 56, 57 are provided, and are provided by being divided into plural (specifically, two) regions in the present embodiment. FIG. 8 indicates a thick broken line overlapping the peripheral region surface 301f for easy understanding of distinction between the mounting region surfaces 301d, 301e, and the peripheral region surface 301f. FIG. 9 indicates the mounting region surfaces 301d, 301e with dotted hatching, and the peripheral region surface 301f with hatching of broken lines. FIG. 9 also indicates peripheral edges of the fixed parts 301a, 301b (see FIG. 5) with two-dot chain lines.

Figure 10:
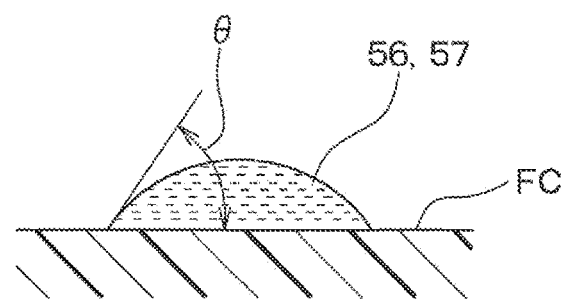
FIG. 10 is a schematic view illustrating a contact angle formed by a liquid surface of a sealing resin in a liquid form on a solid surface.

The mounting region surfaces 301d, 301e have wettability for respectively the sealing resins 56, 57 in a liquid form, the wettability being higher than wettability of the peripheral region surface 301f for the sealing resins 56, 57 in a liquid form. Wettability of a solid surface FC (e.g., the mounting region surfaces 301d, 301e or the peripheral region surface 301f) for the sealing resins 56, 57 in a liquid form means a degree of easiness of wet spread of the sealing resins 56, 57 in a liquid form on the solid surface FC. Thus, high wettability of the solid surface FC for the sealing resins 56, 57 in a liquid form illustrated in FIG. 10 means a small contact angle 8 formed by a surface of each of the sealing resins 56, 57 with the solid surface FC, in other words.

As illustrated in FIGS. 5, 8, and 9, the first mounting region surface 301d, which is one of the two mounting region surfaces 301d, 301e, constitutes a region including a place where the temperature sensor 42 and the first sealing resin 56 are provided. Then, the second mounting region surface 301e, which is the other of the two mounting region surfaces 301d, 301e, constitutes a region including a place where the first and second pressure sensors 43, 44, the humidity sensor 45, and the second sealing resin 57 are provided.

The peripheral region surface 301f constitutes the entire region of the physical quantity sensor mounting surface 301 excluding the two mounting region surfaces 301d, 301e. The placement above allows the first mounting region surface 301d to be provided away from the second mounting region surface 301e, and the peripheral region surface 301f to be interposed between the first mounting region surface 301d and the second mounting region surface 301e.

The circuit board 30 includes the through-holes 303a, 303b that are not soldered and that are provided on the peripheral region surface 301f without being all not provided on any of the mounting region surfaces 301d, 301e. Thus, all of the through-holes 303a, 303b, which are not soldered, are provided at respective positions out of the mounting region surfaces 301d, 301e.

As illustrated in FIGS. 5 and 9, the first and second fixed parts 301a, 301b included in the circuit board 30 are all included in the peripheral region surface 301f. Thus, the first and second fixed parts 301a, 301b are all provided at respective positions out of any of the mounting region surfaces 301d, 301e. More specifically, the first and second fixed parts 301a, 301b are all provided at intervals away from any of the mounting region surfaces 301d, 301e.

As described above, the wettability for the sealing resins 56, 57 in a liquid form is different between the mounting region surfaces 301d, 301e, and the peripheral region surface 301f, and this difference in wettability is imparted to the circuit board 30 alone before a mounting component is mounted, for example. Specifically, the difference in wettability is imparted through steps of FIG. 11.

Figure 11:
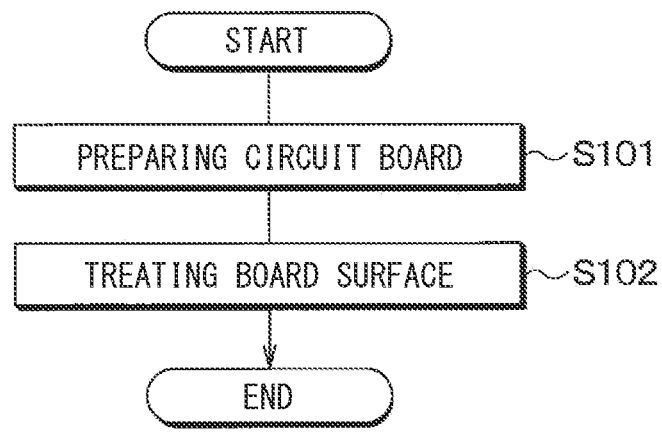
FIG. 11 is a flowchart illustrating a step of increasing wettability of a mounting region surface with respect to a sealing resin in a liquid form to higher than wettability of a peripheral region surface with respect to the sealing resin in a liquid form of the physical quantity sensor mounting surface in the first embodiment.

In the steps of FIG. 11, the circuit board 30 alone is first prepared before the mounting component is mounted in step S101 of preparing a board.

In subsequent step S102 of treating a board surface, surface treatment for imparting the difference in wettability is performed on one or both of the mounting region surface 301d, 301e and the peripheral region surface 301f of the physical quantity sensor mounting surface 301 of the circuit board 30 illustrated in FIG. 9.

For example, fine surface processing is performed on one or both of the mounting region surface 301d, 301e and the peripheral region surface 301f, thereby increasing surface roughness of the mounting region surfaces 301d, 301e to more than surface roughness of the peripheral region surface 301f. In the present embodiment, the surface treatment above increases the wettability of the mounting region surfaces 301d, 301e for the sealing resins 56, 57 in a liquid form to higher than the wettability of the peripheral region surface 301f for the sealing resins 56, 57 in a liquid form.

Next, a step of forming the cured sealing resins 56, 57 on the physical quantity sensor mounting surface 301 in a method for manufacturing the flow rate detection device 10 will be described with reference to FIG. 12. In first step S201 in FIG. 12, the sealing resins 56, 57 in a liquid form before being cured are prepared. Additionally, the circuit board 30 before the sealing resins 56, 57 in a liquid form are applied, or the circuit board 30 equipped with the flow rate sensor 41, the temperature sensor 42, the first pressure sensor 43, the second pressure sensor 44, the humidity sensor 45, the LSI 51, and the microcomputer 52, is prepared.

Figure 12:
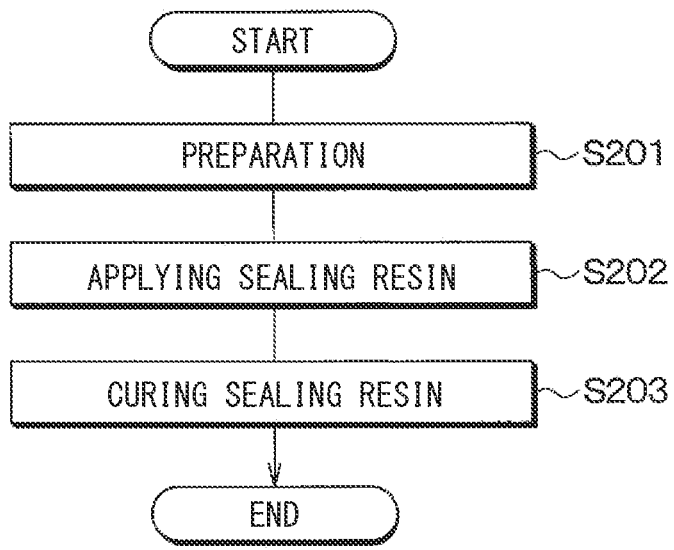
FIG. 12 is a flowchart illustrating a step of forming a cured sealing resin on the physical quantity sensor mounting surface in a method for manufacturing the flow rate detection device of the first embodiment.

In second step S202 subsequent to first step S201 in FIG. 12, the sealing resins 56, 57 in a liquid form are applied onto the physical quantity sensor mounting surface 301 as illustrated in FIG. 8. Specifically, the sealing resins 56, 57 in a liquid form are applied onto the physical quantity sensor mounting surface 301 while covering the electrode parts 422, 432, 442, 452 of respectively the physical quantity sensors 42 to 45. At this time, the sealing resins 56, 57 in a liquid form are respectively applied onto the mounting region surfaces 301d, 301e in FIG. 9 of the physical quantity sensor mounting surface 301, but are not applied onto the peripheral region surface 301f. Thus, it can also be said that the mounting region surfaces 301d, 301e constitute a region including places where the physical quantity sensors 42 to 45 are provided and places where the sealing resins 56, 57 in a liquid form are applied.

In third step S203 subsequent to second step S202 in FIG. 12, the sealing resins 56, 57 on the physical quantity sensor mounting surface 301 are cured. As a method for curing the sealing resins 56, 57, various methods can be used suitable for constituent material of the sealing resins 56, 57. For example, the sealing resins 56, 57 are cured by high-temperature curing, irradiation with laser light, irradiation with ultraviolet rays, natural drying, or the like.

As described above, passing through steps S201, S202, S203 in FIG. 12 allows the first sealing resin 56 to be cured on the first mounting region surface 301d, and the second sealing resin 57 to be cured on the second mounting region surface 301e. Then, the electrode part 422 of the temperature sensor 42 is protected by the cured first sealing resin 56, and the electrode parts 432, 442, 452 of respectively the sensors 43, 44, 45, other than the temperature sensor 42, are protected by the cured second sealing resin 57.

Next, operation of the flow rate detection device 10 will be described. The flow rate detection device 10 outputs information detected by each of the sensors 41, 42, 43, 44, 45 to a control device of an internal combustion engine control system in response to a request or the like from the control device.

During operation of the internal combustion engine, intake air as a fluid to be measured flows through the main passage 2A inside the intake pipe 2. When the fluid to be measured flows through the main passage 2A, the fluid to be measured partly passes through the sub-passage 24 and the open space 25 of the flow rate detection device 10 as illustrated in FIGS. 3 and 4. For example, the fluid to be measured having flowed into the sub-passage 24 from the sub-passage inlet 24a flows through the sub-passage 24 as indicated by the arrows FLa, FLb, and returns from the sub-passage outlet 24b to the main passage 2A.

As described above, the first sealing resin 56 according to the present embodiment is provided on the physical quantity sensor mounting surface 301 while covering the electrode part 422 of the temperature sensor 42 as illustrated in FIG. 5. Then, the second sealing resin 57 is provided on the physical quantity sensor mounting surface 301 while covering the electrode parts 432, 442, 452 of respectively the first pressure sensor 43, the second pressure sensor 44, and the humidity sensor 45. Thus, the electrode parts 422, 432, 442, 452 of respectively the physical quantity sensors 42 to 45 can be sufficiently protected, so that measurement accuracy of a physical quantity of the fluid to be measured with the physical quantity sensors 42 to 45 can be improved.

According to the present embodiment, the physical quantity sensor mounting surface 301 includes the mounting region surfaces 301d, 301e, and the peripheral region surface 301f extending around the mounting region surfaces 301d, 301e, as illustrated in FIGS. 5 and 9. The mounting region surfaces 301d, 301e constitute the region including the places where the physical quantity sensors 42 to 45 are provided and the places where the sealing resins 56, 57 are provided. The mounting region surfaces 301d, 301e have wettability for respectively the sealing resins 56, 57 in a liquid form, the wettability being higher than wettability of the peripheral region surface 301f for the sealing resins 56, 57 in a liquid form.

Thus, when the sealing resins 56, 57 in a liquid form are applied covering the electrode parts 422 to 452 of respectively the physical quantity sensors 42 to 45, the wettability of the peripheral region surface 301f limits wet spread of the sealing resins 56, 57 in a liquid form from the mounting region surfaces 301d, 301e. Variation in the sealing resins 56, 57 accordingly can be reduced as compared with when there is no difference in wettability between the mounting region surfaces 301d, 301e and the peripheral region surface 301f described above. Then, deterioration in quality of the flow rate detection device 10 due to the variation in the sealing resins 56, 57 can be avoided.

Additionally, application ranges of the sealing resins 56, 57 in a liquid form are respectively and easily limited on the mounting region surfaces 301d, 301e that are each a target range, so that the amount of application and the application ranges of the sealing resins 56, 57 are stabilized, and thus leading to reduction in price of the flow rate detection device 10. This configuration also enables preventing adverse effects due to protrusion of the sealing resins 56, 57 from respectively the mounting region surfaces 301d, 301e. For example, the electrode parts 422, 432, 442, 452 of respectively the physical quantity sensors 42 to 45 can be prevented from being insufficiently covered due to unnecessary wet spread of the sealing resins 56, 57.

Variation in the amount of application of the first sealing resin 56 can be reduced, so that variation in heat capacity of the temperature sensor 42 can be also reduced. Thus, variation in responsivity of the temperature sensor 42 and variation in temperature characteristics of the temperature sensor 42 can be reduced.

According to the present embodiment, the circuit board 30 illustrated in FIGS. 5 and 6 is, for example, a glass epoxy board using a glass epoxy material as a base material. As a result, the circuit board 30 can be obtained at low cost, and heat transfer through the circuit board 30 can be reduced.

According to the present embodiment, the physical quantity sensor mounting surface 301 equipped with the physical quantity sensors 42 to 45 is the first surface 301 of the circuit board 30. The flow rate sensor 41 is provided on the second surface 302 of the circuit board 30. Thus, there is an advantage in that the flow rate sensor 41 and the physical quantity sensors 42 to 45 can be easily laid out to prevent a flow of the fluid to be measured around the flow rate sensor 41 and the physical quantity sensors 42 to 45 from being obstructed. Additionally, there is also an advantage in that mutual thermal influence between the flow rate sensor 41 and the physical quantity sensors 42 to 45 can be easily reduced.

According to the present embodiment, the first mounting region surface 301*d* is provided away from the second mounting region surface 301*e*, and the peripheral region surface 301*f* is interposed between the first mounting region surface 301*d* and the second mounting region surface 301*e*, as illustrated in FIGS. 5 and 9. This configuration enables reducing thermal influence on the temperature sensor 42 from the other sensors 43, 44, 45, for example, as compared when the first mounting region surface 301*d* is connected to the second mounting region surface 301*e* without the peripheral region surface 301*f* interposed therebetween.

According to the present embodiment, the circuit board 30 includes the through-holes 303*a*, 303*b* that are not soldered, and all of the through-holes 303*a*, 303*b*, which are not soldered, are provided at respective positions out of the mounting region surfaces 301*d*, 301*e*. Thus, the sealing resins 56, 57 in a liquid form applied to the mounting region surfaces 301*d*, 301*e* can be prevented from leaking to the second surface 302 of the circuit board 30 through the through-holes 303*a*, 303*b* before being cured.

According to the present embodiment, all of the first and second fixed parts 301*a*, 301*b* included in the circuit board 30 are provided at respective positions out of any of the mounting region surfaces 301*d*, 301*e*. Thus, the measurement part body 231 can be molded by insert molding while reducing influence of the shapes of the sealing resins 56, 57 as compared with, for example, when any one of the first and second fixed parts 301*a*, 301*b* overlaps the mounting region surfaces 301*d*, 301*e*. The measurement part body 231 accordingly can be easily formed by insert molding.

Oher Embodiments (1) Although in the first embodiment described above, the circuit board 30 includes the two fixed parts 301*a*, 301*b* fixed to the measurement part body 231 as a part of the physical quantity sensor mounting surface 301 as illustrated in FIG. 5, the fixed parts 301*a*, 301*b* are not limited in number. The number of each of the fixed parts 301*a*, 301*b* may be one, or three or more.

(2) Although in the first embodiment described above, the physical quantity sensor mounting surface 301 is the first surface 301 of the circuit board 30 as illustrated in FIGS. 5 and 6, this is an example. The physical quantity sensor mounting surface 301 may be the second surface 302 of the circuit board 30 instead of the first surface 301, or may be both the first surface 301 and the second surface 302 of the circuit board 30.

(3) Although in the first embodiment described above, the circuit board 30 includes the through-holes 303*a*, 303*b* that are not soldered as illustrated in FIGS. 5 and 6, the through-holes 303*a*, 303*b* are not limited in number. For example, the number of the through-holes 303*a*, 303*b* that are not soldered may be one, or the circuit board 30 may not have the through-holes 303*a*, 303*b* that are not soldered.

(4) Although in the first embodiment described above, the peripheral region surface 301*f* constitutes the entire region of the physical quantity sensor mounting surface 301 excluding the two mounting region surfaces 301*d*, 301*e* as illustrated in FIG. 9, this is an example. The peripheral region surface 301*f* may not constitute the entire region excluding the two mounting region surfaces 301*d*, 301*e* as long as the peripheral region surface 301*f* extends around the mounting region surfaces 301*d*, 301*e*.

Although FIG. 9 illustrates the peripheral region surface 301*f* that extends surrounding the entire circumference of the first mounting region surface 301*d*, surrounding the entire circumference of the first mounting region surface 301*d* is not indispensable. The same applies to a relationship between the peripheral region surface 301*f* and the second mounting region surface 301*e*. That is, although the peripheral region surface 301*f* extends surrounding the entire circumference of the second mounting region surface 301*e*, surrounding the entire circumference of the second mounting region surface 301*e* is not indispensable.

(5) Although in the first embodiment described above, the mounting region surfaces 301*d*, 301*e* each have surface roughness larger than surface roughness of the peripheral region surface 301*f* to allow each of the mounting region surfaces 301*d*, 301*e* to have wettability higher than wettability of the peripheral region surface 301*f*, this is an example.

Specifically, instead of allowing the mounting region surfaces 301*d*, 301*e* to have surface roughness different from surface roughness of the peripheral region surface 301*f*, the following processing may be performed in step S102 of treating a board surface in FIG. 11. As a first alternative example instead of the processing of making a difference in surface roughness, it is conceivable to perform processing of making a difference between material constituting the mounting region surfaces 301*d*, 301*e*, and material constituting the peripheral region surface 301*f*. The processing is, for example, plating processing or coating processing.

That is, the processing allows at least the mounting region surfaces 301*d*, 301*e* or the peripheral region surface 301*f* to be composed of a coating film formed by plating or coating, whereby the material constituting the mounting region surfaces 301*d*, 301*e* is different from the material constituting the peripheral region surface 301*f*. Then, the difference above between the material constituting the mounting region surfaces 301*d*, 301*e* and the material constituting the peripheral region surface 301*f*, causes the mounting region surfaces 301*d*, 301*e* to have wettability higher than wettability of the peripheral region surface 301*f*. In short, this case allows at least the mounting region surfaces 301*d*, 301*e* or the peripheral region surface 301*f* to be composed of a coating film formed by plating or coating, whereby the mounting region surfaces 301*d*, 301*e* have the wettability higher than the wettability of the peripheral region surface 301*f*.

As a second alternative example instead of the processing of making a difference in surface roughness in step S102 of treating a board surface in FIG. 11, it is conceivable to cause the mounting region surfaces 301*d*, 301*e* to be different in surface shape from the peripheral region surface 301*f*. The surface shape is, for example, a step or undulation, and is formed by, for example, machining or the like. In this case, the difference in surface shape between the mounting region surfaces 301*d*, 301*e* and the peripheral region surface 301*f*, causes the mounting region surfaces 301*d*, 301*e* to have the wettability higher than the wettability of the peripheral region surface 301*f*.

As a third alternative example instead of the processing of making a difference in surface roughness in step S102 of treating a board surface in FIG. 11, it is conceivable to perform laser processing or plasma processing on the physical quantity sensor mounting surface 301. In this case, performance of the laser processing or the plasma processing on at least the mounting region surfaces 301*d*, 301*e* or the peripheral region surface 301*f* causes the mounting region surfaces 301d, 301e to have the wettability higher than the wettability of the peripheral region surface 301f.

(6) Although in the first embodiment described above, the physical quantity sensors 42 to 45 are provided in the open space 25 as illustrated in FIG. 3, the placement form of the physical quantity sensors 42 to 45 is not limited thereto. For example, when the circuit board 30 is configured to be partly exposed to the outside of the housing 20, the physical quantity sensors 42 to 45 may be at least partly mounted on a part of the circuit board 30 exposed to the outside of the housing 20.

(7) Although in the first embodiment described above, the sub-passage 24 is formed in the shape illustrated in FIGS. 3 and 4, this is an example, and thus various shapes can be assumed as the shape of the sub-passage 24.

(8) Although in the first embodiment described above, the four physical quantity sensors 42 to 45 different from the flow rate sensor 41 are provided as illustrated in FIGS. 5 and 6, the number of physical quantity sensors 42 to 45 may be one, two, three, or five or more.

(9) Although in the first embodiment described above, FIGS. 1 and 2 each illustrate an example in which the flow rate detection device 10 is applied to the internal combustion engine control system, the flow rate detection device 10 is applicable to various systems other than the internal combustion engine control system.

(10) The present disclosure is not limited to the embodiments described above, and various modifications can be made. In the above embodiments, it is needless to say that elements constituting the embodiments are not necessarily indispensable except a case of being specified to be particularly indispensable and a case where it is considered to be obviously indispensable in principle.

When the number of components, a numeric value, an amount, and a numeric value of a range or the like, are described in the embodiments described above, the values each are not limited to a specific number except a case of being specified to be particularly indispensable, a case of being apparently limited to a specific number in principle, and the like. Additionally, when a material, a shape, a positional relationship, and the like, of a component and the like are described in the embodiments described above, the present invention is not limited to the material, the shape, the positional relationship, and the like except a case of being particularly specified, a case of being limited to a specific material, shape, positional relationship, or the like in principle, and the like.

What is claimed is:

1. A flow rate detection device, comprising:
a housing having a sub-passage configured to partly pass a fluid, which flows through a main passage to be measured;
a circuit board partly fixed to the housing and equipped with a flow rate sensor, which is provided in the sub-passage and configured to detect a flow rate of the fluid to be measured, and at least one electronic component;
a physical quantity sensor mounted, as a sensor different from the flow rate sensor, on the circuit board, the physical quantity sensor including an electrode part electrically connected to the circuit board, and configured to detect a physical quantity of the fluid to be measured; and
a sealing resin provided on a physical quantity sensor mounting surface, which is formed on the circuit board and equipped with the physical quantity sensor, and covers the electrode part, wherein
the physical quantity sensor mounting surface includes:
a mounting region surface including a place where the physical quantity sensor is provided and a place where the sealing resin is provided, and
a peripheral region surface that extends around the mounting region surface, and
a wettability of the mounting region surface for the sealing resin in a liquid form is higher than a wettability of the peripheral region surface for the sealing resin in the liquid form.

2. The flow rate detection device according to claim 1, wherein
a surface roughness of the mounting region surface is larger than a surface roughness of the peripheral region surface, such that the wettability of the mounting region surface is higher than the wettability of the peripheral region surface.

3. The flow rate detection device according to claim 1, wherein
a material of the mounting region surface is different from a material of the peripheral region surface, such that the wettability of the mounting region surface is higher than the wettability of the peripheral region surface.

4. The flow rate detection device according to claim 3, wherein
at least one of the mounting region surface or the peripheral region surface is composed of a coating film, which is formed by plating or coating, such that the material of the mounting region surface is different from the material of the peripheral region surface.

5. The flow rate detection device according to claim 1, wherein
a surface shape of the mounting region surface is different from a surface shape of the peripheral region surface, such that the wettability of the mounting region surface is higher than the wettability of the peripheral region surface.

6. The flow rate detection device according to claim 1, wherein
the circuit board is a glass epoxy board.

7. The flow rate detection device according to claim 1, wherein
the circuit board includes a first surface that is the physical quantity sensor mounting surface and a second surface opposite to the first surface, and
the flow rate sensor is provided on the second surface.

8. The flow rate detection device according to claim 1, wherein
the physical quantity sensor is one of a plurality of physical quantity sensors,
the plurality of the physical quantity sensors includes a temperature sensor, which is configured to detect a temperature of the fluid to be measured, and an other sensor, which is other than the temperature sensor,
the physical quantity sensor mounting surface includes a plurality of the mounting region surfaces, which includes
a first mounting region surface that includes a place where the temperature sensor is provided and
a second mounting region surface that includes a place where the other sensor is provided,
the first mounting region surface is away from the second mounting region surface, and
the peripheral region surface is interposed between the first mounting region surface and the second mounting region surface.

9. The flow rate detection device according to claim 1, wherein
the circuit board includes one or more through-holes without being soldered, and
all the through-holes are provided at respective positions out of the mounting region surface.

10. The flow rate detection device according to claim 1, wherein
the circuit board includes, as a part of the physical quantity sensor mounting surface, one or more fixed parts fixed to the housing, and
all the fixed parts are provided at respective positions out of the mounting region surface.

11. A method for manufacturing a flow rate detection device, the flow rate detection device including:
a housing including a sub-passage configured to partly pass a fluid, which flows through a main passage to be measured, and
a circuit board partly fixed to the housing, the circuit board being equipped with:
a flow rate sensor, which is provided in the sub-passage and configured to detect a flow rate of the fluid to be measured, and
at least one electronic component,
the method comprising:
preparing the circuit board equipped with a physical quantity sensor, which is different from the flow rate sensor and configured to detect a physical quantity of the fluid to be measured, the physical quantity sensor including an electrode part electrically connected to the circuit board and a sealing resin in a liquid form;
applying the sealing resin in the liquid form to a physical quantity sensor mounting surface, which is formed on the circuit board and equipped with the physical quantity sensor, to cover the electrode part; and
curing the sealing resin after the sealing resin is applied, wherein
the physical quantity sensor mounting surface includes:
a mounting region surface including a place where the physical quantity sensor is located, and
a peripheral region surface extending around the mounting region surface,
a wettability of the mounting region surface for the sealing resin in the liquid form is higher than a wettability of the peripheral region surface for the sealing resin in the liquid form, and
the sealing resin in the liquid form is applied to the mounting region surface of the physical quantity sensor mounting surface in the applying the sealing resin.

12. The method for manufacturing the flow rate detection device according to claim 11, further comprising:
performing laser processing or plasma processing on the physical quantity sensor mounting surface to cause the mounting region surface to have the wettability higher than the wettability of the peripheral region surface.

13. The method for manufacturing the flow rate detection device according to claim 11, wherein the circuit board further includes a control circuit having the at least one electronic component.

14. The flow rate detection device according to claim 1, wherein the circuit board further includes a control circuit having the at least one electronic component.

* * * * *